(12) United States Patent
Solomon et al.

(10) Patent No.: US 6,968,409 B1
(45) Date of Patent: Nov. 22, 2005

(54) METHOD AND APPARATUS OF ESTABLISHING A DYNAMICALLY ADJUSTABLE LOOP OF DELAYED READ COMMANDS FOR COMPLETION IN A QUEUE BUFFER

(75) Inventors: Richard L. Solomon, Colorado Springs, CO (US); Eugene Saghi, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 517 days.

(21) Appl. No.: 09/942,390

(22) Filed: Aug. 29, 2001

(51) Int. Cl.[7] .............................................. G06F 13/00
(52) U.S. Cl. ....................... 710/112; 710/6; 710/241; 710/310
(58) Field of Search ................................ 710/5, 20, 52, 710/53, 54, 55, 112, 305, 6, 310, 241

(56) References Cited

U.S. PATENT DOCUMENTS

| 5,615,343 | A | * | 3/1997 | Sarangdhar et al. | ........ 710/112 |
| 5,850,530 | A | * | 12/1998 | Chen et al. | ................. 710/113 |
| 5,870,567 | A | * | 2/1999 | Hausauer et al. | ........... 710/310 |
| 6,012,118 | A | * | 1/2000 | Jayakumar et al. | ......... 710/107 |
| 6,112,266 | A | * | 8/2000 | Yeh | .............................. 710/52 |
| 6,233,641 | B1 | * | 5/2001 | Graham et al. | ............. 710/316 |
| 6,247,086 | B1 | * | 6/2001 | Allingham | .................. 710/314 |
| 6,694,400 | B1 | * | 2/2004 | Lai et al. | ..................... 710/305 |

OTHER PUBLICATIONS

Daniel Kovacs, "Tutorial on Linked List", 1998, htto://www.fortunecity.com/skyscraper/false/780/linklist.html.*

* cited by examiner

*Primary Examiner*—Mark H. Rinehart
*Assistant Examiner*—Justin I. King
(74) *Attorney, Agent, or Firm*—L. Jon Lindsay (57) ABSTRACT

A loop of delayed read commands is established from a larger set of queued commands. Upon recognizing a delay in completing a first read command which is followed by a second read command, the loop is established by setting loop start pointer to identify the first delayed read command and setting a loop end pointer to identify the second read command. Upon recognizing a delay in completing the second read command which is followed by a third read command, the loop end pointer is advanced to identify the third read command. All of the read commands in the loop at and between the loop start pointer and the loop end pointer are completed before attempting to complete other commands in the queue not within the loop.

11 Claims, 7 Drawing Sheets

METHOD AND APPARATUS OF ESTABLISHING A DYNAMICALLY ADJUSTABLE LOOP OF DELAYED READ COMMANDS FOR COMPLETION IN A QUEUE BUFFER

This invention relates to input/output (I/O) data transfer devices and processes. More particularly, the present invention relates to a new and improved method and apparatus for establishing a loop of delayed read commands which can be dynamically expanded or contracted to optimize the number of delayed read commands that may be processed by an I/O interface device, such as a PCI bus interface, for the purpose of enabling a relatively greater throughput of data in a set amount of time.

BACKGROUND OF THE INVENTION

Many high-performance I/O interface devices have buffers in which to establish a queue of read and write commands. Using the buffer to establish the queue of I/O commands allows a processor or processors of a computer system to which the I/O interface device is attached to continue other computational functions, while the read and write I/O commands are processed separately. The I/O commands may be processed by a state machine or by a separate processor which is functionally part of the I/O interface device. As a result, the main computational processing functions are not delayed while awaiting the completion of the I/O commands, and the processing functionality of the computer system is enhanced.

One typical use of a queue command buffer is in a bus interface device, such as a conventional PCI bus interface device which is described in the PCI 2.2 protocol specification. The queue command buffer is typically a first-in first-out (FIFO) buffer which contains the read and write I/O commands that are to be completed. The commands in the command buffer are completed in a FIFO fashion, assuring that each command will ultimately be completed. New I/O commands are written into the top of the queue of the FIFO command buffer, and when a previous command has been fully completed the command is unloaded from the bottom of the queue of the FIFO buffer.

Upon attempting to complete a read command from the command buffer and failing to receive data in response to that read command, a queue pointer remains at the position of the read command which has incurred a delayed response. Not unloading the delayed read command from the queue of in the FIFO buffer causes the delayed read command to be retried until a response is received. This type of continued attempted completion of the delayed read command is known as a spin on single retried request. A spin on single retried request permits issuing only one read command until that read command has been completed. A spin on single retried request is achieved by maintaining the position of the queue pointer at the delayed read command until that read command is completed, at which time the then-completed read command is unloaded from the queue of the FIFO buffer.

Another type of technique for handling delayed read commands in the queue of the FIFO buffer is known as head-of-list alternation. Head-of-list alternation involves an added capability to alternate or swap another read command within the FIFO buffer in place of the delayed read command at the head of the list in the queue. Thus, upon encountering a first delayed read command, and if the next command in the FIFO buffer is also a read command, the relative position of the first delayed command and the next read command is alternated, so that an attempt is made to complete the next read command while the first read command is delayed. After the swap or alternation, completion of the second command is attempted. If the second command is successfully completed, it is unloaded from the queue and completion of the first delayed read command is again attempted. If the first read command is again delayed, the head-of-list alternation will again seek to substitute another read command following the first delayed read command, if another such read command is available in the queue. However, if the next command in the FIFO buffer is not a read command, the first delayed read command is again retried until it is completed. This head-of-list alternation therefore works only if two read commands are available in sequential positions in the queue of the FIFO buffer. If a command other than a read command follows a delayed read command, head-of-list alternation is not possible.

Head-of-list alternation between delayed read commands is more efficient than a spin on single retried request of the first delayed read command, because alternating between two read commands offers the opportunity to enqueue two read commands to target devices, such as memories or disk drives, for response and offers the possibility of receiving a response from one of the two enqueued read commands during the waiting time that would normally be encountered while waiting for a response to only a single enqueued read command. The latency in response of a target device to a read command is spread over two target devices, and the latency is thereby diminished in relation to the number of read commands which are completed. As a consequence, the data throughput is enhanced compared to the data throughput achieved when a single delayed read command must be retried continually before any other commands in the queue command buffer can be completed.

Head-of-list alternation works for two sequential read commands in the FIFO buffer because there are never any gaps between read commands. If a gap between read commands exists, head-of-list alternation is not performed and instead, spin on single retried request is performed until the delayed read command is completed. Head-of-list alternation is accomplished only because of the ability to swap the two sequential read commands until one of them is completed at the top of the list and is unloaded from the FIFO buffer.

Although the PCI 2.2 protocol specification theoretically supports the concept of extending the number of delayed read commands beyond two, no specific technique has been described for doing so. Substantial complexities are encountered when attempting to expand the number of delayed read commands beyond two, particularly in regard to handling those delayed read commands that may have been completed between the first and the last ones of a greater number of delayed read commands. The PCI 2.2 protocol specification does not specifically address a capability for adjusting the depth or content of the number of delayed read commands between the first and last delayed read commands. Consequently, head-of-list alternation offers the possibility of completing two sequential delayed read commands, but does not extend in a straightforward manner to the possibility of attempting completion of three or more delayed read commands. In some computer systems, head-of-list alternation offers only slightly increased performance (reduced latency) compared to spin on single retried request performance, because of the extent of the delays encountered in response to read commands in complex modern computer systems.

These and other considerations have given rise to the present invention.

SUMMARY OF THE INVENTION

The present invention offers the improved capability of establishing a queue of delayed read commands which is arbitrary in length in a command buffer, and which permits the first delayed read command and the last delayed read command in the queue to be dynamically adjusted in accordance with the completion of the delayed read commands. The number of delayed read commands in the queue is dynamically adjusted and optimized for completion to increase the data throughput by reducing the latency associated with delayed read commands.

More specifically, the present invention relates to a method of establishing a loop of delayed read commands for completion in a queue of commands. The loop of delayed read commands may include all the commands in the queue or a subset of the commands in the queue. The method comprises recognizing a delay in completion of a first read command in the queue, setting a loop start pointer to identify the first delayed read command, continuing to issue commands and advance a loop end pointer so long as there are read commands available in the queue, and attempting to complete the read commands at and between the loop start pointer and the loop end pointer until all of those read commands have been completed, before attempting to complete other commands in the queue.

Other aspects of the method involve advancing a loop start pointer once the first delayed read command has completed; advancing the loop end pointer when a new read command is added to the queue; eliminating the loop start pointer and the loop end pointer to abolish the loop upon recognizing the completion of all but the last read command of the loop; and adjusting the position of a queue pointer which normally selects the commands in the queue for completion so that the queue pointer moves through the commands at and between the loop start pointer and the loop end pointer until all of the commands at and between the loop start pointer and the loop end pointer have been completed.

Another specific aspect of the present invention relates to an interface controller for communicating commands and data to at least one, and usually a plurality of, target devices (e.g., memories and/or disk drive storage devices) to which the read commands are addressed. The interface controller comprises a command queue having a command buffer in which the commands are recorded, a data mover for transferring commands and data to the target device and for receiving responses and data from the target device in response to the commands, and a queue processor connected to the command queue and the data mover and which operatively applies selected commands from the command buffer to the data mover to be transferred to the target device for completion. The queue processor includes programmed logic functionality which: applies a first read command from the command buffer to the data mover for transfer to a target device for completion, recognizes a response from the target device indicating a delay in completion of the first read command, determines that the command in the command buffer following the first read command is a second read command, sets a loop start pointer to identify the first read command, sets a loop end pointer to identify the second read command, applies the second read command from the command buffer to the data mover for transfer to the target device for completion, recognizes a response from the target device indicating a delay in completion of the second read command, continues to advance the loop end pointer, and apply the read commands from the command buffer to the data mover so long as there are read commands available.

Other aspects of the queue processor of the interface controller include programmed logic functionality which: identifies the read commands identified by and between the loop start pointer and the loop end pointer as delayed read commands, establishes a loop of the delayed read commands, and applies the delayed read commands of the loop to the data mover for transfer to the target device for completion before applying any other read commands from the command buffer to the data mover for transfer to the target device; recognizes responses from each target device indicating completion of a read command transferred to the target device, recognizes completion of the delayed read command identified by the loop start pointer, and thereafter advances the loop start pointer to identify the next uncompleted delayed read command of the loop; advances the loop start pointer to identify the delayed read command which is also identified by the loop end pointer upon recognizing that all of the other delayed read commands in the loop have been completed, and thereafter abolishes the loop by eliminating the loop start pointer and the loop end pointer; applies the delayed read commands of the loop to the data mover for transfer to the target device for completion until the loop of delayed read commands is abolished, before applying any other read commands from the command buffer to the data mover for transfer to the target device; and overrides the normal positioning of the queue pointer positioning functionality of the interface controller, and limits the position of the queue pointer to those commands identified by and between the loop start pointer and the loop end pointer until all of the uncompleted delayed read commands identified between the loop start pointer and the loop end pointer have been completed.

A more complete appreciation of the present invention and its scope may be obtained from the accompanying drawings, which are briefly summarized below, from the following detail descriptions of presently preferred embodiments of the invention, and from the appended claims.

DETAILED DESCRIPTION

Figure 1:
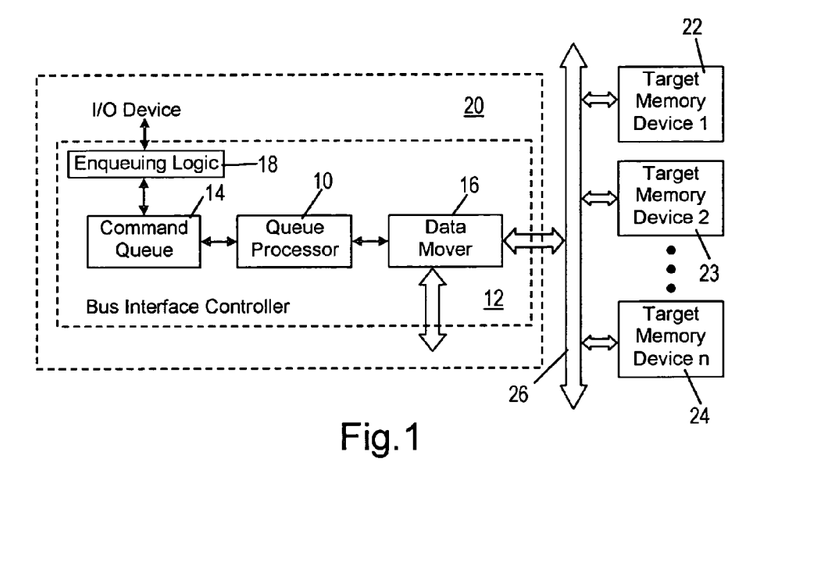
FIG. 1 is a block diagram of a portion of a bus interface controller, in which the present invention is incorporated, and also a portion of a bus including multiple target devices.

The present invention is advantageously executed by a queue processor 10 shown in FIG. 1. The queue processor 10 is part of a bus interface controller 12, and the bus interface controller 12 also includes a conventional command queue 14, a conventional data mover 16 and conventional command enqueuing logic 18. The queue processor 10 is connected to both the command queue 14 and the data mover 16 for interaction with both in the manner described below. The enqueuing logic 18 is connected to the command queue 14, and functions to place or put commands received from a conventional I/O device 20 into the command queue 14. Other than the queue processor 10, the bus interface controller 12 is conventional. The bus interface controller 12 is part of an otherwise-conventional I/O device 20.

The I/O device 20, including the bus interface controller 12 and the data mover 16, are connected to at least one and typically more target devices 22, 23 and 24, through a conventional bus 26. Typical target devices are or include memories, disk drive storage devices, bridges or other devices to and through which I/O commands may be routed and completed. Data is written, data is read, and commands are otherwise transferred between the I/O device 20 and the target devices 22, 23 and 24 by signals communicated to and from the bus interface controller 12 over the bus 26. Each target device 22, 23 and 24 also includes a bus interface (not shown) which communicates the signals from the bus between the components of the target device 22, 23 or 24 and the bus 26. The bus interface controller 12, the bus 26, and the bus interfaces which are part of the target devices may be, for example, a part of a PCI bus which is otherwise conventional except for the queue processor 10 and its associated functionality in which the present invention is embodied.

The queue processor 10 improves the transfer of data read from the target devices 22, 23 and 24, and in general improves the completion of commands communicated between the I/O device 20 and the target devices 22, 23 and 24. The data read from the target devices 22, 23 and 24 is supplied over the bus 26 and delivered to the I/O device 20. The I/O device delivers the data to a processor and other components of a computer system (not shown) to which the I/O device 20 is connected. The queue processor 10 transfers more read commands to the data mover 16 for completion by the target devices 22, 23 and 24 in a given or reduced amount of time, to thereby obtain enhanced overall I/O performance.

Figure 2A:
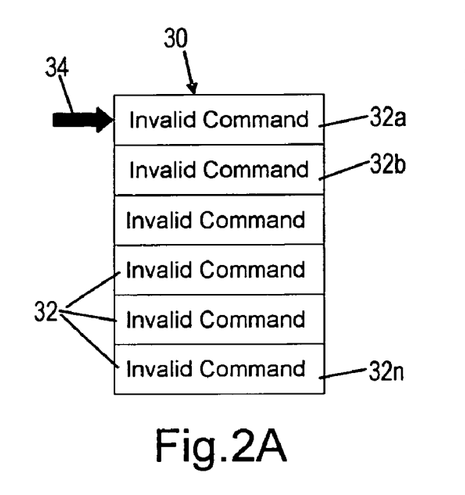
FIGS. 2A, 2B, 2C, 2D, 2E, 2F, 2G, 2H, 2I, 2J, 2K, 2L, 2M, 2N, 2O, 2P, 2Q and 2R are illustrations of commands in a circular queue command buffer of the bus interface controller shown in FIG. 1, and also collectively illustrating the functionality achieved by the present invention.
Figure 2B:
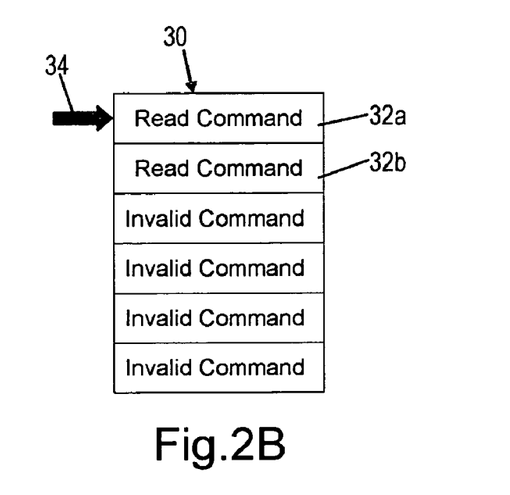
Figure 2C:
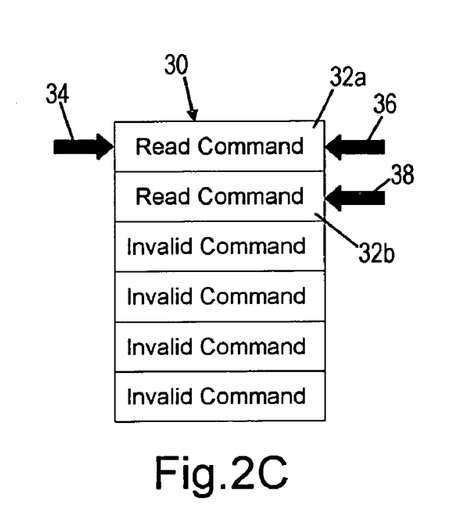
Figure 2D:
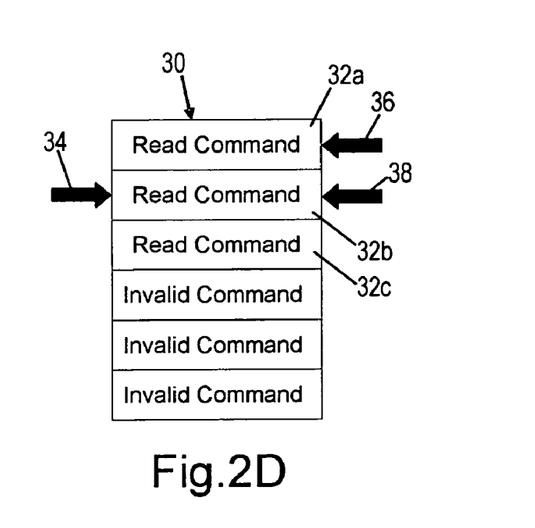
Figure 2E:
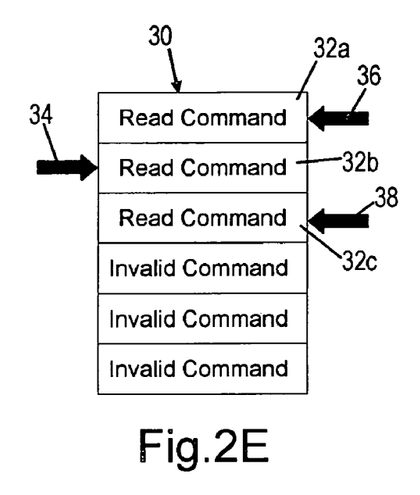
Figure 2F:
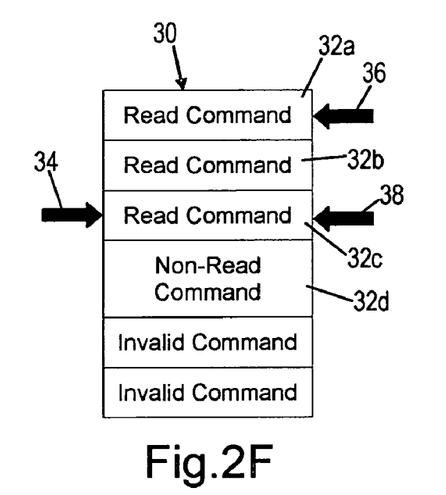
Figure 2G:
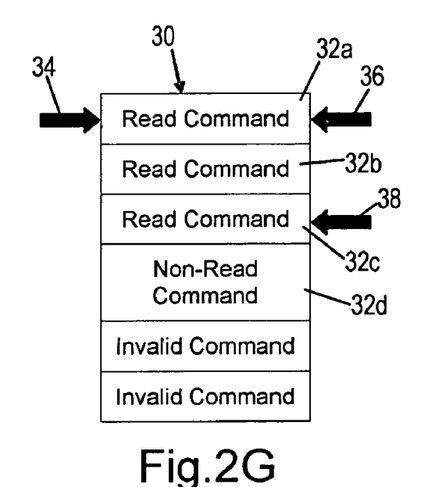
Figure 2H:
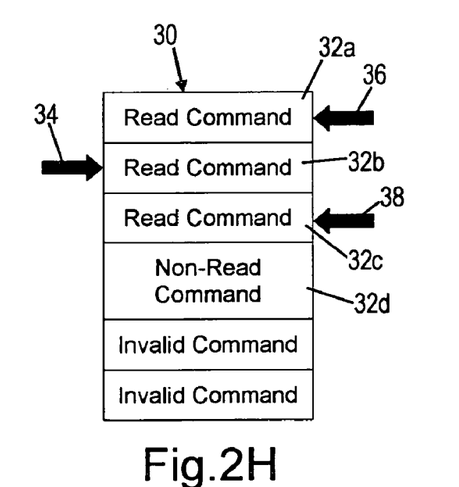
Figure 2I:
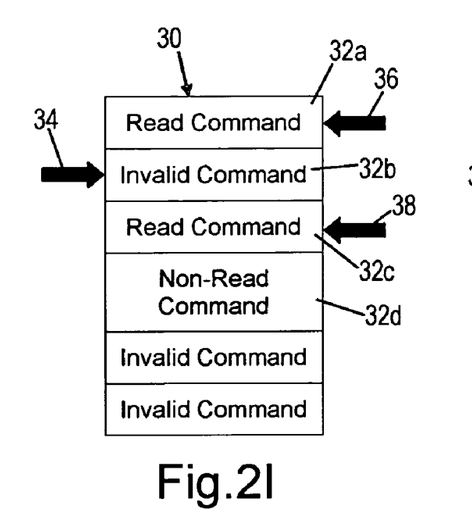
Figure 2J:
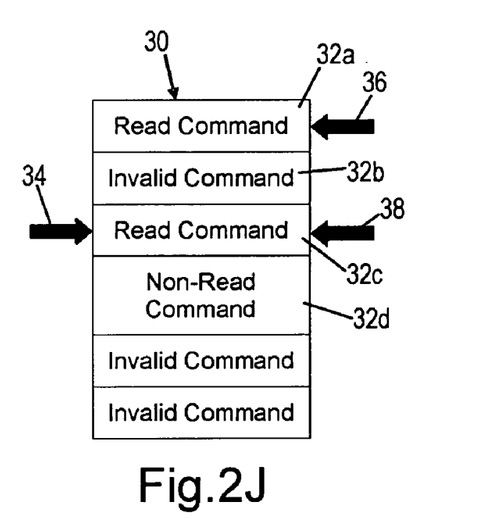
Figure 2K:
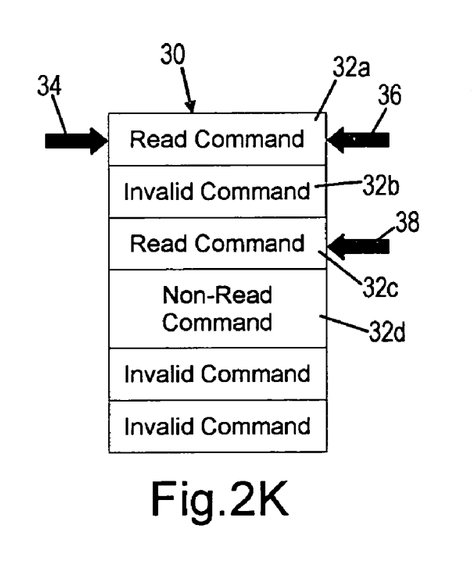
Figure 2L:
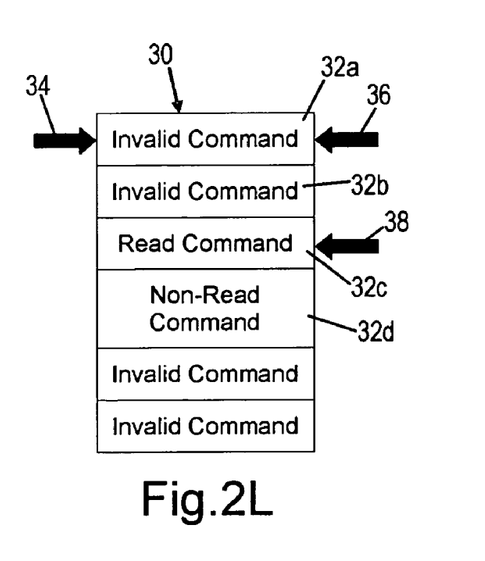
Figure 2M:
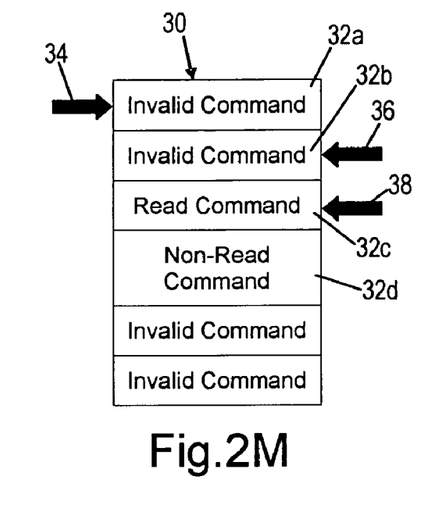
Figure 2N:
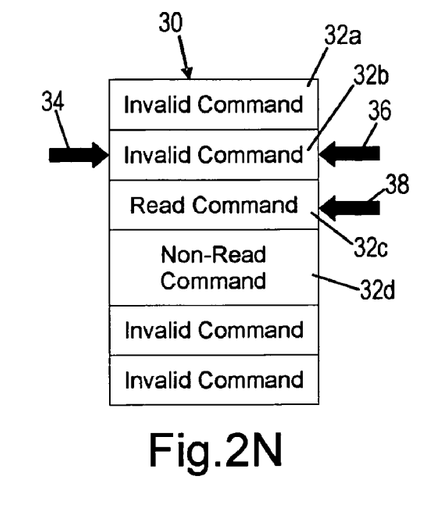
Figure 2O:
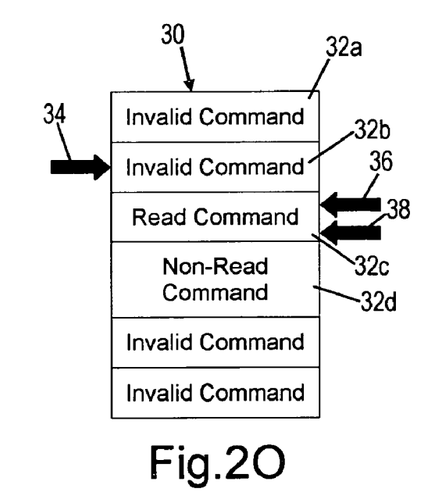
Figure 2P:
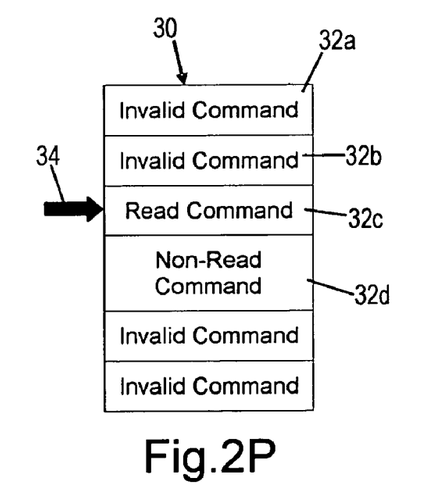
Figure 2Q:
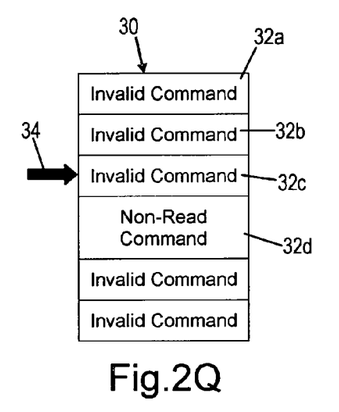
Figure 2R:
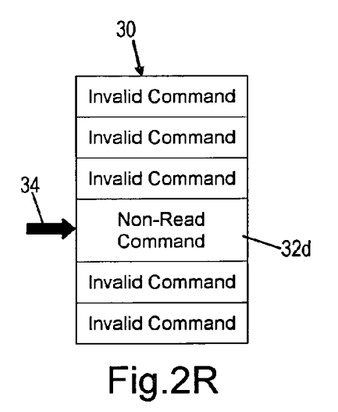

The command queue 14 establishes a circular queue command buffer 30 of the form shown in FIGS. 2A to 2R. Conventional I/O commands 32 are contained within the queue command buffer 30, and the commands 32 are completed in a circular manner in the sense that the commands 32 contained within the buffer 30 are logically completed in a loop so that a first command 32a is typically completed immediately after the last command 32n. Moreover, as a general consequence of the circular and logical loop, the commands are also typically completed in a first-in first-out (FIFO) sequence. However, as will be seen from the following description of the present invention, delayed read commands in a loop may not strictly be completed in a FIFO sequence, although their completion will occur in a more efficient manner than if a strict FIFO sequence was observed.

The commands in the buffer 30 shown in FIGS. 2A to 2R are generically referred to by the reference number 32, and individual commands are specifically identified by the specific reference numbers 32a, 32b, 32c, 32d, etc. to 32n. The commands 32 in the buffer 30 are typically read and write commands. A conventional read command causes the bus interface controller 12 to send a read request to a target devices 22, 23 or 24 (FIG. 1), which results in retrieval of the data from that target devices at the address identified in the read command and transmission of that data back to the I/O device 20. A conventional write command involves sending a write command to a target device 22, 23 or 24 along with the data to be written, and the target device 22, 23 or 24 responds by writing the data at the address specified in the write command 32. A command may specify that a very large amount of data be moved. Because of protocol specifications applicable to the sizes of transactions, the amount of available buffer space, and the like, a single command may be broken up into multiple parts. The data for all of the data parts of the single transaction need not be moved at one time, but until all of the data parts of the transaction had been moved, the command will not have been completed.

If a read or write command cannot be immediately completed, because of other activity occurring at the target device 22, 23 or 24, the read or write command becomes a delayed transaction. A delayed transaction is a command that must complete on the target device before completing on the master originating I/O device. A delayed transaction progresses to completion in three steps: first, a request by the master; second, completion of the request by the target; and third, completion of the transaction by the master. During the first step, the master generates a transaction, the target decodes the access, latches the information required to complete the access, and terminates the request by an indication to the master to retry. In order to complete the transaction, the master must at a later time reissue the request until the request completes. During the second step, the target independently completes the request using the latched information. If the delayed transaction is a read request, the target obtains the requested data. If the delayed transaction is a write request, the target writes the data. The target stores information indicating that it has completed its part of the transaction. During the third step, the master reissues the original request. The target, having previously completed the delayed transaction, sends the master a signal indicating that the transaction has been completed. The status information returned to the master is exactly the same as the information obtained by the target when it completed the delayed read request. The present invention is primarily useful in completing delayed transactions, as is apparent from the following description.

The command 32 which is tried is identified by a conventional get queue pointer 34 which is part of the command buffer 30. The typical position of the get queue pointer 34 relative to the commands 32 in the buffer 30 is established by conventional functionality of the bus interface controller 12. The conventional functionality of the bus interface controller 12 may be defined by the PCI 2.2 protocol specification, as one example. The queue processor 10 (FIG. 1) modifies and controls the normal positioning of the get queue pointer 34 by establishing a non-conventional and additional loop start pointer 36 and a non-conventional and additional loop end pointer 38, as is shown in FIGS. 2C to 2O and as is discussed in conjunction with a process flow 40 shown in FIG. 3. The queue processor defines a dynamically adjustable loop of delayed read commands which are completed before other commands of the command buffer are completed. In this manner, more read commands are completed and less time is consumed by the latency of the responses from the target devices.

The commands 32 are placed in the buffer 30 by the conventional enqueuing logic 18, shown in FIG. 1. The enqueuing logic 18 includes a put pointer (not shown) which points to a location in the buffer 30 of an invalid command. An invalid command is one that has been previously completed. An invalid command, having been completed, can be replaced by a new, valid command for which subsequent completion is desired by the I/O device 20. The put pointer of the enqueuing logic 18 operates independently of the get queue pointer 34, the loop start pointer 36 and loop end pointer 38 (FIGS. 2A to 2R). The put pointer is generally in advance of the location of the get queue pointer 34, to enable the buffer 30 to be loaded with commands which are to be completed subsequently. However, when there are no valid commands in the buffer 30, the get queue pointer 34 and the put pointer will be at the same location, with the put pointer identifying the location where the enqueuing logic 18 will insert the next valid command and with the get queue pointer 34 identifying that same location where the queue processor 10 will start to work on the next valid command entered at that location. The enqueuing logic 18 manages the location of the put pointer in a conventional manner. Consequently, the activity of the put pointer and the enqueuing logic 18 is not part of the present invention, although the present invention does interact with this conventional functionality in the manner described below.

Figure 3:
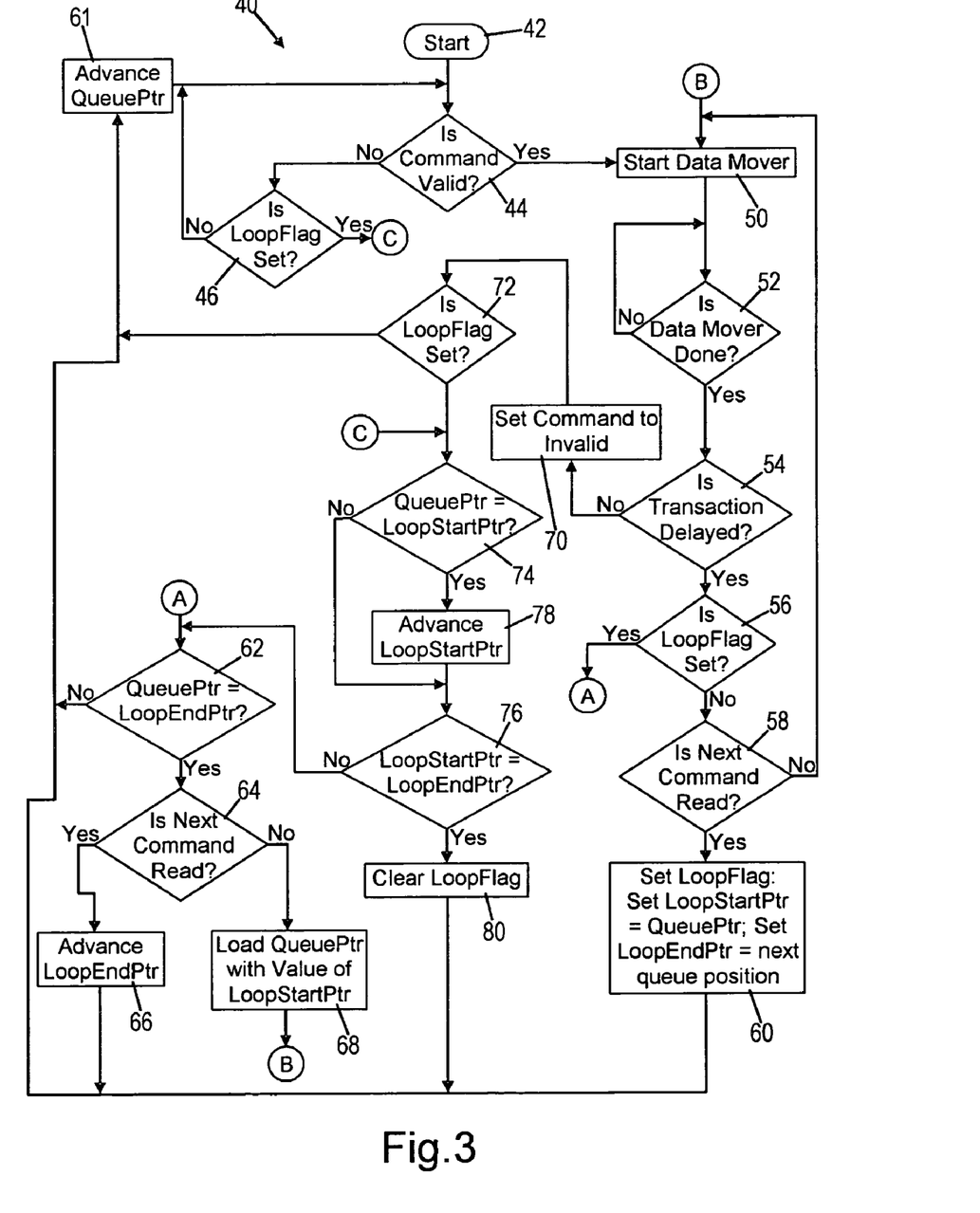
FIG. 3 is a flowchart of the operations involved in the present invention as performed by the bus interface controller shown in FIG. 1 and in accordance with the illustrations shown in FIGS. 2A to 2R.

The individual steps or functions of the process flow 40 are shown in FIG. 3 and are referred to below by individual reference numbers. The individual functions or steps of the process flow 40 are sometimes achieved in connection with the items previously identified in FIGS. 1 and 2A to 2R. The process flow 40 is advantageously executed by a state machine. In which case, the queue processor 10 (FIG. 1) may be implemented by conventional logic circuitry organized and programmed as a state machine to implement the process flow 40. The process flow 40 can also be executed by a separate processor associated with the I/O device. In which case, the process flow 40 is embodied in programmed instructions which execute on the processor.

The process flow 40 begins at 42. A determination is made at 44 whether the command 32 in the command buffer 30 which is identified by the get queue pointer 34 (FIG. 2) is a valid command. A valid command is one which has not been completed. An invalid command is one which has been previously completed, and after completion, has been marked invalid. For example, as shown in FIG. 2A, the pointer 34 identifies a command 32a which has been marked as invalid because the command 32a has previously been completed. A command which is not marked as invalid is presumed to be valid. Marking a command which has been completed as invalid is a conventional functionality of the bus interface controller 12 (FIG. 1). After having been marked invalid, the completed command can be replaced with a valid command in the command buffer 30 by the enqueuing logic 18 (FIG. 1). Because the command buffer 30 is circular, adding the new valid command to replace an invalid command will ultimately result in the completion of the new command.

If the determination at 44 indicates that the get queue pointer 34 is pointing to an invalid command (e.g., FIG. 2A), the process flow advances to a determination at 46 of whether a loop flag is set. The loop flag determination at 46 refers to whether the present invention is active or not. A loop flag is set when the present invention is active, and the loop flag is not set when the present invention is not active. When the present invention is not active, the completion of the commands 32 in the queue buffer 30 (FIGS. 2A–2R) will occur in accordance with the normal protocol and functionality of the bus interface controller 12 (FIG. 1). When the present invention becomes active, the queue processor 10 (FIG. 1) controls the completion of the commands in the command buffer by controlling the position of the get queue pointer 34, and setting the loop start pointer 36 and loop end pointer 38.

If the loop flag is not set as determined at 46, and the command is invalid as determined at 44, the process flow 40 reverts back to step 44. This situation occurs when the get queue pointer 34 identifies an invalid command as shown in FIG. 2A. In this condition, the get queue pointer 34 is simply spinning at this location waiting for the enqueuing logic 18 (FIG. 1) to insert a valid command in the location of the get queue pointer 34.

The process flow moves between steps 44 and 46 until such time as the enqueuing logic 18 (FIG. 1) inserts a valid command 32a at the location of the get queue pointer 34, as shown in the FIG. 2B. FIG. 2B also illustrates the condition where the enqueuing logic 18 has replaced two sequential invalid commands with two valid commands 32a and 32b. Under the circumstance where an invalid command has been replaced by a valid command, an affirmative or positive determination at 44 causes the data mover (16, FIG. 1) to start as shown at 50. Starting the data mover results in transferring the read command 32a (in this case) from the command buffer to the data mover. The data mover (16, FIG. 1) transmits the read command 32a on the bus 26 to the target device 22, 23 or 24 (FIG. 1) to which it is addressed.

Thereafter the data mover waits for the target device to respond by returning the requested data over the bus 26 to the data mover (16, FIG. 1), or by signalling that the request will be delayed. The process flow 40 progresses to 52 while the data mover is waiting, and a determination is made at 52 when the data mover has either received the requested data or has received a response from the target device that the data transfer will be delayed.

Next, at 54, a determination is made as to whether the transaction has been delayed. In this example where the command is the read command 32a, the target device 22, 23 or 24 to which the read command 32a was addressed may need to delay the completion of the read command because it is unable to immediately respond with the data requested. A read command may be delayed, for example, as a result of the target device processing other read commands from other devices connected to the bus 26 (FIG. 1). Some target devices, such as host bridges, have the capability of enqueuing multiple read commands for subsequent completion. In that case, a delay will be encountered until the enqueued read command is actually completed and the data fetched by completing that read command is supplied.

Assuming that the read command transaction is delayed as determined at 54, a determination is made at 56 of whether the loop flag is set. As noted above, setting the loop flag invokes the functionality of the present invention. Not setting the loop flag allows the conventional functionality of the bus interface controller to continue without modification and control from the queue processor 10 (FIG. 1). At this point in this example, the loop flag has not previously been set, so the determination at 56 is negative.

In response to the determination that the loop flag has not been set at 56, the next step 58 in the process flow 40 is to determine whether the next command 32 in the command buffer 30 is a valid read command. As shown in FIG. 2B, the next command 32b is a valid read command. Consequently, the determination at step 58 is affirmative. At step 58 in the process flow 40, the first read command 32a has been delayed, as determined at 54, and the next read command 32b is determined to be a valid read command at 58. The present invention recognizes the opportunity to take advantage of sequential read commands to attempt to complete the next read command (32b in this example) when a previous read command has been delayed. Completing a subsequent read command when a previous read command has been delayed has the advantage of increasing the potential for data throughput while waiting for the first delayed read command to complete by attempting to complete other read commands when none would otherwise be completed.

On the other hand, if the determination at 58 is that the next command is not a read command, the process flow 40 moves from step 58 back to step 50. A loop is established through the steps 50, 52, 54, 56 and 58 until such time as the delayed read command (e.g., 32a in FIG. 2B) is finally completed and consequently is determined to be no longer delayed at step 54. However, instead of looping from step 58 to step 50 as would occur as a result of a negative determination at step 58, the present example involves determining at 58 that the next command is a read command.

At step 60, the loop flag is set, which indicates that the present invention is active. Also at step 60, the loop start pointer 36 is set at the position of the first delayed read transaction, which at this stage of the example, is the command 32a at the location of the get queue pointer 34, as shown in FIG. 2C. The loop end pointer 38 is set at the next position in the command buffer 30, which is command 32b in this example. Thus, as a result of executing step 60, the loop start and end pointers 36 and 38 are set on the first delayed and next sequential read commands 32a and 32b, respectively, as shown in FIG. 2C. The process flow then advances the get queue pointer at step 61. At step 61, the get queue pointer 34 is advanced to the next sequential read command 32b, which is shown in FIG. 2D as command 32b. The advancement of the get queue pointer 34 at step 61 is accomplished by the normal functionality of the bus interface controller 12 (FIG. 1).

At this point in this example, some of the process flow 40 repeats with respect to the read command 32b (FIG. 2D). The command 32b is determined to be valid at 44, because the determination at 58 is only affirmative when the next read command is a valid read command. The data mover is started at 50 with respect to the read command 32b (FIG. 2D), and a wait loop is established at 52 until the data mover is done. At 54, the response from the target device is evaluated to determine whether the read command 32b has been delayed. For purposes of this example, assume that the read command 32b is delayed, causing the process flow 40 to advance to 56. The determination at 56 is affirmative, because the loop flag has previously been set at step 60. Consequently, the process flow advances from 56 to the determination at 62.

At 62, a determination is made as to whether the get queue pointer 34 is at the position of the loop end pointer 38. As can be seen from FIG. 2D, this is the case and the determination at 62 is affirmative. Next at step 64, a determination is made as to whether the next command is a read command. The next command shown in this example in FIG. 2D is a read command 32c, so the determination at 64 is affirmative. The enqueuing logic (18, FIG. 1) has previously replaced the invalid command with the valid write command 32c. The affirmative determination at 64 results in advancing the loop end pointer 38 from the delayed read command 32b to the read command 32c at step 66, as is shown in FIG. 2E.

Thus, as a result of advancing the loop end pointer at step 66, the loop end pointer 38 is positioned on the third read command 32c, because the first and second read commands 32a and 32b have been delayed. The loop start pointer 36 points to the first delayed read command 32a and the loop end pointer 38 points to the read command 32c, which has not yet been determined to be delayed because the command 32c has not been attempted. The process flow advances to step 61, where the get queue pointer 34 is advanced to the read command 32c, as shown in FIG. 2F.

The process flow thereafter advances to the determination at 44, which is affirmative as a result of the previous determination at step 58 with respect to the read command 32c. The data mover is started at 50 and a wait loop is established at 52 to determine the response to the attempt to complete the read command 32c. Once the data mover is done as determined at 52, the response to the read command 32c will be assumed to be delayed as determined at 54, for purposes of this example. Thus, in this example, three read commands 32a, 32b and 32c have been delayed. The determination at 56 is affirmative because of the previous recognition of the two delayed read commands 32a and 32b, and the process flow advances to step 62.

As shown in FIG. 2F, the get queue pointer 34 is at the location of the loop end pointer 38, so the determination at step 62 is affirmative. The determination at step 64 will be negative, because the next valid command 32d in the command buffer 30 (previously inserted by the enqueuing logic 18, FIG. 1) is a non-read command, as shown in FIG. 2F. An example of a non-read command may be a write command. The occurrence of a valid non-read command or an invalid command in the buffer 30 establishes the end of the loop of delayed read commands.

Upon the negative determination at step 64, the get queue pointer 34 is loaded with the value of the loop start pointer 36, at step 68. Loading the value of the get queue pointer 34 equal to the value of the loop start pointer 36 causes the get queue pointer 34 to move to the location of the first delayed read command 32b, as shown in FIG. 2G. The process flow 40 moves from step 68 to step 50, where completion of the first delayed read command 32a is attempted by starting the data mover at 50 and waiting until the data mover is done at 52.

For purposes of this example, the response to the second completion attempt of the first delayed read command 32a is again delayed, as determined at 54. The process flow advances to step 56 where the loop flag is determined to have been set previously. The determination at 62 is negative, because as shown in FIG. 2G, the get queue pointer 34 is not at the location of the loop end pointer 38. The negative determination at 62 advances the process flow to step 61, where the get queue pointer 34 is advanced to the second delayed read command 32b as shown in FIG. 2H.

The process flow 40 then advances to the determination at 44 which recognizes the validity of the second delayed read command 32b. The data mover is started at 50, and a wait loop is established at 52 until such time as the data mover is done. Assume for purposes of this example that the second delayed read command is not further delayed as determined at step 54, because the second read command 32b was completed by the target device to which it is addressed, and the completed read command was reported back to the I/O device. Thus, the determination at 54 is negative and the process flow advances to step 70.

Because the second read command 32b was completed, the read command 32b is marked or set invalid at step 70. The read command 32b is shown as invalid in FIG. 2I as a result of executing step 70. A determination is made at step 72 of whether the loop flag is set, which is the case because the loop flag will remain set since the read commands 32a and 32c are still delayed at this point in this example. It is thereafter determined at step 74 whether the get queue pointer 34 is at the location of the loop start pointer 36. As shown in FIG. 2I, this is not the case, so the process flow advances to step 76. At step 76, it is determined whether the loop start pointer 36 is equal to or at the location of the loop end pointer 38. In this example, the determination at 76 is also negative, as shown in FIG. 2I, so the process flow advances to step 62. The get queue pointer 34 is not at the location of the loop end pointer 38, so the determination at 62 is negative. The process flow 40 moves to step 61 where the get queue pointer 34 is advanced to the location of the third delayed read command 32c, as shown in FIG. 2J.

The third delayed read command 32c still remains valid as determined at 44, and an attempt to complete this command occurs by starting the data mover at 50. When the data mover is done at 52, it is assumed for purposes of this example that the third delayed read command 32c is again delayed as determined at 54. The determination at 56 is affirmative because the loop flag remains set, and the process flow advances to step 62. The get queue pointer 34 is at the location of the loop end pointer 38, as determined at 62 and as shown in FIG. 2J, so the process flow advances to step 64. At step 64, it is determined whether the next command 32d is a read command. In this example as shown in FIG. 2J, the next command 32d is not a read command. If the non-read command 32d was an invalid command that had been replaced by a valid read command at some point during the execution of this process flow, the loop end pointer would be advanced at step 66 to encompass the newly added read command in the position 32d. However in this example, assume that the non-read command 32d remains and has not been replaced by a valid read command. Consequently, step 68 is executed, and the get queue pointer 34 is moved or advanced to the position of the loop start pointer 36 at step 68, as shown in FIG. 2K.

The first delayed read command 32a remains valid, as determined at step 44. An attempt is made again to complete the read command 32a by starting the data mover at step 50. When the data mover completes its activity at step 52, it is assumed for purposes of this example that the read command 32a has been completed, and therefore the read command 32a will not be delayed as determined at 54. The read command 32a is set invalid at step 70, as shown in FIG. 2L. The loop flag remains set as determined at step 72, and the determination at step 74 is that the get queue pointer 34 is at the location of the loop start pointer 36 as shown in FIG. 2L.

Next, at 78, the loop start pointer 36 is advanced as shown in FIG. 2M. Execution of the step 78 advances the loop start pointer and shrinks the number of commands between the loop start pointer 36 and the loop end pointer 38. In this manner, the process flow 40 has the ability to dynamically reduce or shrink the starting point of the loop of delayed read commands, thereby accommodating the changed conditions which result from completion of the delayed read commands. Moreover, the process flow 40 does not require the delayed read commands to complete in the order in which they were originally loaded into the buffer 30, and in this regard the present invention does not strictly complete the delayed read commands on a first-in, first-out basis as would be the typical case.

After advancing the start loop pointer 36 at 78, a determination is made at 76 of whether the loop start pointer location is equal to the loop end pointer location. As is shown in the example of FIG. 2M, this is not the case, and the determination at 76 is negative. A determination thereafter occurs at 62 to determine whether the position of the get queue pointer 34 is equal to the position of the loop end pointer 38, which is shown in FIG. 2M not to be the case. The negative determination at 62 moves the process flow to step 61, where the get queue pointer 34 is advanced to the invalid command 34b, as shown in FIG. 2N.

The determination at 44 with respect to the invalid command 32b causes the process flow to advance to the determination 46. The loop flag is still set as shown in FIG. 2N because the loop start pointer 36 and the loop end pointer 38 are still operative. With the affirmative determination at step 46, the process flow 40 advances to the determination at 74. Under the conditions in this example, the get queue pointer 34 is at the same location as the loop start pointer 36, as shown in FIG. 2N. The determination at 74 is affirmative, which causes the loop start pointer 36 to advance as shown at step 78 and in FIG. 2O.

The location of the loop start pointer 36 is therefore the same as the location of the loop end pointer 38, as shown in FIG. 2O, causing the determination at step 76 to be affirmative. With the loop start pointer at the same location as the loop end pointer, there is no necessity for maintaining the loop of delayed read commands between the loop start pointer 36 and the loop end pointer 38. Consequently, there is no further need for the present invention and the loop flag is cleared at step 80.

With the loop flag cleared at step 80, the loop start pointer 36 and the loop end pointer 38 are eliminated, as shown in FIG. 2P, to abolish the loop of delayed read commands. The process flow thereafter moves to step 61 where the get queue pointer 34 is advanced one location to the third delayed read command 34c, as shown in FIG. 2P. The third delayed read command 32c is still valid, as determined at 44, and is attempted to be completed by starting the data mover at 50. After the read command 32c has been completed as determined at 52, it is determined at 54 that the third read command transaction 32c is completed. The completed third read command 34c is set invalid at 70, as shown in FIG. 2Q. The determination at step 72 indicates that the loop flag is no longer set, causing the process flow to move to step 61 where the get queue pointer 34 is advanced to the next command 32d, which in this example is the non-read command 32d, as shown in FIG. 2R.

The preceding discussion of the example of the process flow 40 demonstrates the technique for establishing a dynamically adjustable loop of delayed read commands which can be completed before other commands in the command queue 30 are completed. Upon encountering a first delayed read command followed by another read command, the process flow of the present invention is invoked by setting the loop start pointer 36 and the loop end pointer 38 to define the adjustable loop, as shown in FIG. 2C. The extent or length of the number of delayed read commands will be accommodated by the dynamically adjustable nature of the loop. The loop will dynamically expand to accommodate additional delayed read commands, as is shown by comparing FIGS. 2D and 2E. Moreover, the starting point of the adjustable loop can also be changed to shrink the loop by eliminating those leading delayed read commands from the loop that have been completed. Shrinking the starting point or head end of the adjustable loop is illustrated by comparing FIGS. 2L and 2M, and by comparing FIGS. 2N and 2O. The get queue pointer 34 is advanced through the adjustable loop to attempt to complete the delayed read commands until each of those read commands is ultimately completed, at which time the adjustable loop is no longer necessary, as is shown by comparing FIGS. 2O and 2P. The adjustable nature of the loop of delayed read commands can be expanded to encompass more or less than the number of delayed read commands which have been described in the examples of FIGS. 2A to 2R.

The dynamically adjustable nature of the loop of delayed read commands achieves a higher throughput of data read from the target devices. Instead of requiring the completion of a single delayed read command to be continually retried (spun on) until the target device can respond with the requested data, other read commands may be attempted and completed during the time that would otherwise be consumed by spinning on the single retried request. The same applies with respect to waiting for the response from a pair of delayed read commands which are alternately attempted to be completed. The flow of data from the target devices to the computer system progresses on a more constant and uniform basis, without the interruptions which previously occurred while a single one or two delayed read commands were continually completed until they were completed. Many other improvements and advantages will appear upon gaining a full understanding and appreciation for the present invention.

A presently preferred embodiment of the present invention and many of its improvements have been described with a degree of particularity. This description is a preferred example of implementing the invention, and is not necessarily intended to limit the scope of the invention. The scope of the invention is defined by the following claims.

The invention claimed is:

1. An interface controller for communicating commands and data to at least one target device attached to the interface controller; the interface controller comprising:
   a command queue having a command buffer in which the commands are recorded;
   a data mover for transferring commands to a target device and receiving responses from the target device in response to commands; and
   a queue processor connected to the command queue and the data mover, the queue processor operatively applying selected commands from the command buffer to the data mover to be transferred to the target device for completion, the queue processor including programmed logic functionality which:
   applies a first read command from the command buffer to the data mover for transfer to a target device for completion;
   recognizes a response from the target device indicating a delay in completion of the first read command;
   determines that the command in the command buffer following the first read command is a second read command;
   sets a loop start pointer to identify the first read command;
   sets a loop end pointer to identify the second read command;
   applies the second read command from the command buffer to the data mover for transfer to a target device for completion;
   recognizes a response from the target device indicating a delay in completion of the second read command;
   determines that the command in the command buffer following the second read command is a third read command;
   advances the loop end pointer to identify the third read command;
   applies the third read command from the command buffer to the data mover for transfer to a target device for completion; and
   advances the loop end pointer to the next subsequent read command in the command buffer upon recognizing the first delay in completing the preceding read command.

2. An interface controller as defined in claim 1, wherein the queue processor includes further programmed logic functionality which:
   identifies the read commands identified by and between the loop start pointer and the loop end pointer as delayed read commands;
   establishes a loop of the delayed read commands; and
   applies the delayed read commands of the loop to the data mover for transfer to the target device for completion before applying any other read commands from the command buffer to the data mover for transfer to the target device.

3. An interface controller as defined in claim 2, wherein the queue processor includes further programmed logic functionality which:
   recognizes responses from each target device indicating completion of each read command transferred to the target device;
   recognizes completion of the delayed read command identified by the loop start pointer; and thereafter
   advances the loop start pointer to identify the next uncompleted delayed read command of the loop.

4. An interface controller as defined in claim 3, wherein the queue processor includes further programmed logic functionality which:
   advances the loop start pointer to identify the delayed read command which is also identified by the loop end pointer upon recognizing that all of the other delayed read commands in the loop have been completed; and thereafter
   abolishes the loop by eliminating the loop start pointer and the loop end pointer.

5. An interface controller as defined in claim 2, wherein the queue processor includes further programmed logic functionality which:
   recognizes the completion of all but a remaining one of the delayed read commands in the loop; and thereafter
   abolishes the loop by eliminating the loop start pointer and the loop end pointer.

6. An interface controller as defined in claim 5, wherein the queue processor includes further programmed logic functionality which:
   recognizes a response from the target device indicating completion of the remaining one delayed read command; and thereafter
   applies another command from the command buffer to the data mover for transfer to the target device for completion, the another command being a command not included in the loop before the loop was abolished.

7. An interface controller as defined in claim 2, wherein the queue processor includes further programmed logic functionality which:
   applies the delayed read commands of the loop to the data mover for transfer to the target device for completion until the loop of delayed read commands is abolished, before applying any other read commands from the command buffer to the data mover for transfer to the target device.

8. An interface controller as defined in claim 1, wherein the commands of the command buffer are normally selected for completion by queue positioning functionality of the interface controller which positions a queue pointer to identify the command of the command buffer selected for completion, and the queue processor includes further programmed logic functionality which:
   overrides the normal positioning of the queue positioning functionality of the interface controller; and
   limits the position of the queue pointer to those commands identified by and between the loop start pointer and the loop end pointer until all of the uncompleted read commands identified between the loop start pointer and the loop end pointer have been completed.

9. An interface controller as defined in claim 8, wherein the queue processor includes further programmed logic functionality which:
    marks each delayed read command identified by and between the loop start pointer and the loop end pointer as invalid upon completion of that command.

10. An interface controller as defined in claim 1, wherein the queue processor includes further programmed logic functionality which:
    advances the loop start pointer to the next subsequent command in the command buffer after the command identified by the loop start pointer has been completed.

11. An interface controller as defined in claim 1, wherein the queue processor includes further programmed logic functionality which:
    determines that the command in the command buffer following the third read command is a fourth read command;
    advances the loop end pointer to identify the fourth read command; and
    applies the fourth read command from the command buffer to the data mover for transfer to a target device for completion.

* * * * *